US011294699B2

(12) United States Patent
Glade et al.

(10) Patent No.: US 11,294,699 B2
(45) Date of Patent: Apr. 5, 2022

(54) DYNAMICALLY SCALED HYPERCONVERGED SYSTEM ESTABLISHING MINIMUM SUPPORTED INTEROPERABLE COMMUNICATION PROTOCOL BETWEEN CLUSTERS IN A CLUSTER GROUP

(71) Applicant: HEWLETT PACKARD ENTERPRISE DEVELOPMENT LP, Houston, TX (US)

(72) Inventors: Bradford B. Glade, Westborough, MA (US); Peter F. Corbett, Lexington, MA (US); Gareth Richards, Woodstock (GB); Michael Healey, North Grosvenordale, CT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 347 days.

(21) Appl. No.: 16/023,029

(22) Filed: Jun. 29, 2018

(65) Prior Publication Data

US 2020/0004570 A1 Jan. 2, 2020

(51) Int. Cl.
*G06F 9/455* (2018.01)
*G06F 9/50* (2006.01)
*H04W 4/08* (2009.01)

(52) U.S. Cl.
CPC ........ *G06F 9/45558* (2013.01); *G06F 9/5077* (2013.01); *G06F 2009/4557* (2013.01); *G06F 2009/45595* (2013.01); *H04W 4/08* (2013.01)

(58) Field of Classification Search
None
See application file for complete search history.

(56) References Cited

U.S. PATENT DOCUMENTS 5,657,452 A * 8/1997 Kralowetz ............ H04L 29/06
709/227
6,353,620 B1 * 3/2002 Sallberg ................ H04L 29/06
370/410

(Continued)

OTHER PUBLICATIONS

Techopedia: Definition of VMM (Year: 2013).*

(Continued)

*Primary Examiner* — Michael W Ayers
(74) *Attorney, Agent, or Firm* — Jaffery Watson Mendonsa & Hamilton

(57) ABSTRACT

Cluster groups define a relationship between clusters in an HCI system. New cluster groups may be created, and a cluster may be added or removed from an existing cluster group. A method and system are disclosed to support a dynamically scaled hyperconverged system with non-overlapping and overlapping cluster groups. A dynamically scalable hyperconverged system may allow for piece-wise upgrades while supporting inter-operable and non-interoperable components having a secure intercommunication capability. A system is disclosed for scaling a single managed hyperconverged infrastructure (HCI) where all components are allowed to run a compatible communication protocol (e.g., interoperable communication protocol) but are not required to operate an interoperable software version. Further, methods are disclosed to a) illustrate consolidation of backups for a cluster of HCI nodes running interoperable and non-interoperable data exchange protocols; and b) dynamically organize groups of clusters to enforce interoperability requirements and simplify network configuration among these clusters.

22 Claims, 8 Drawing Sheets

(56) References Cited

U.S. PATENT DOCUMENTS

| | | | | |
|---|---|---|---|---|
| 7,260,818 | B1* | 8/2007 | Iterum | G06F 8/71 |
| | | | | 717/102 |
| 7,917,617 | B1* | 3/2011 | Ponnapur | G06F 9/45558 |
| | | | | 709/224 |
| 9,201,887 | B1* | 12/2015 | Earl | G06F 11/1451 |
| 9,432,301 | B2* | 8/2016 | Jahanbanifar | H04L 47/70 |
| 2006/0282545 | A1* | 12/2006 | Arwe | G06F 8/71 |
| | | | | 709/237 |
| 2007/0174264 | A1* | 7/2007 | Bae | G06F 16/283 |
| 2007/0220522 | A1* | 9/2007 | Coene | G06F 30/394 |
| | | | | 718/104 |
| 2008/0275969 | A1* | 11/2008 | Saba | G06Q 10/00 |
| | | | | 709/220 |
| 2009/0276654 | A1* | 11/2009 | Butterworth | G06F 11/182 |
| | | | | 714/1 |
| 2013/0219030 | A1* | 8/2013 | Szabo | H04L 49/70 |
| | | | | 709/221 |
| 2015/0312104 | A1 | 10/2015 | Riewrangboonya et al. | |
| 2015/0363216 | A1* | 12/2015 | Sampathkumar | G06F 9/45558 |
| | | | | 718/1 |
| 2016/0323375 | A1 | 11/2016 | Shanley et al. | |
| 2017/0003991 | A1* | 1/2017 | Strandzhev | G06F 9/5077 |
| 2017/0123831 | A1 | 5/2017 | Byard et al. | |
| 2017/0135249 | A1 | 5/2017 | Jensen | |
| 2017/0206034 | A1 | 7/2017 | Fetik | |
| 2017/0235772 | A1 | 8/2017 | Livshits et al. | |
| 2017/0322827 | A1 | 11/2017 | Little et al. | |
| 2017/0371649 | A1 | 12/2017 | Li et al. | |
| 2019/0220271 | A1* | 7/2019 | Olderdissen | G06F 8/656 |

OTHER PUBLICATIONS https://www.stratoscale.com/blog/hyperconvergence/better-approach-hyperconverged-solution-arrived/.

Michael Richards, "Don't Wait—A Better Approach to Hyperconverged Systems has Arrived," Sep. 8, 2016, pp. 1-8 [online], Stratoscale, Retrieved from the Internet on Feb. 14, 2018 at URL: <stratoscale.com/blog/hyperconvergence/better-approach-hyperconverged-solution-arrived/>.

Extended European Search Report received for EP Patent Application No. 19183385.4, dated Nov. 7, 2019, 8 pages.

HPE, "HPE SimpliVity hyperconverged infrastructure for VMware vSphere" May 2018, pp. 1-29.

SimpliVity, "SimpliVity OmniStack 3.5.1 Host Deployment Guide", Mar. 2016, pp. 1-67.

* cited by examiner

DYNAMICALLY SCALED HYPERCONVERGED SYSTEM ESTABLISHING MINIMUM SUPPORTED INTEROPERABLE COMMUNICATION PROTOCOL BETWEEN CLUSTERS IN A CLUSTER GROUP

BACKGROUND

In the field of network computing, hyperconverged infrastructure (HCI) deployments typically consist of a common management system that provides a user-interface used to manage one or more clusters of hyperconverged systems. Hyperconvergence refers to an IT framework that combines storage, computing and networking into a single system (e.g., a physical machine such as a server class computer) in an effort to reduce data center complexity and increase scalability. Hyperconverged platforms typically include a hypervisor and run on standard servers. A hypervisor or virtual machine monitor (VMM) is computer software, firmware or hardware that creates and runs one or more virtual machines on a single hardware server. A computer (e.g., server) on which a hypervisor runs these one or more virtual machines is called a host machine, and each virtual machine is called a guest machine. In some implementations, multiple systems may be clustered together to create pools of shared compute and storage resources. Each cluster in such a system typically supports a collection of one or more applications running in the context of one or more virtual machines that are supported by the cluster. Each cluster may have limited resources and hence may be able to support a limited number of virtual machines and applications within the cluster. The resource limits of a cluster may be expanded by adding nodes to the cluster, but such additions are typically limited and constrained by the data sharing among the compute and data nodes that make up the cluster. For example, because of data throughput limitations between the nodes. Additionally, clusters may provide isolation to the applications running therein, in part, because the applications may share memory, compute, and storage resources only among the applications running within the cluster.

Different types of applications have different workload characteristics, such as I/O patterns, CPU consumption, and memory footprints, that may or may not perform well together on the same set of shared hardware resources. For these reasons, users of an HCI will often deploy multiple clusters of hyperconverged nodes to gain the benefits of additional scale and isolation. For the ease of managing these clusters it may be desirable to manage multiple clusters from a single management system. Single management support may be provided, for example, by modern virtual infrastructure (vSphere from VMware, SCVMM from Microsoft). However, these management systems have limits to the number of clusters they are able to manage. It may also be desirable to provide isolation of management for the purpose of data security, scalability of human administration of the system, and operation in states when the infrastructure is not fully connected. Furthermore, it may be desirable to support technologies from different vendors (e.g. VMware and Microsoft) in the same federated system to, for example, gain the benefits of flexibility and vendor independence.

The disclosed dynamically scaled hyperconverged system represents an improvement to the art of configuring and supporting multi-node and multi-cluster hyperconverged systems. Improvements are provided, in part, by introducing new levels of logical groupings and support infrastructure to increase flexability provided to system administrators that manage an HCI. Additionally, disclosed techniques address the problem of support for technologies from different vendors in a single HCI.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
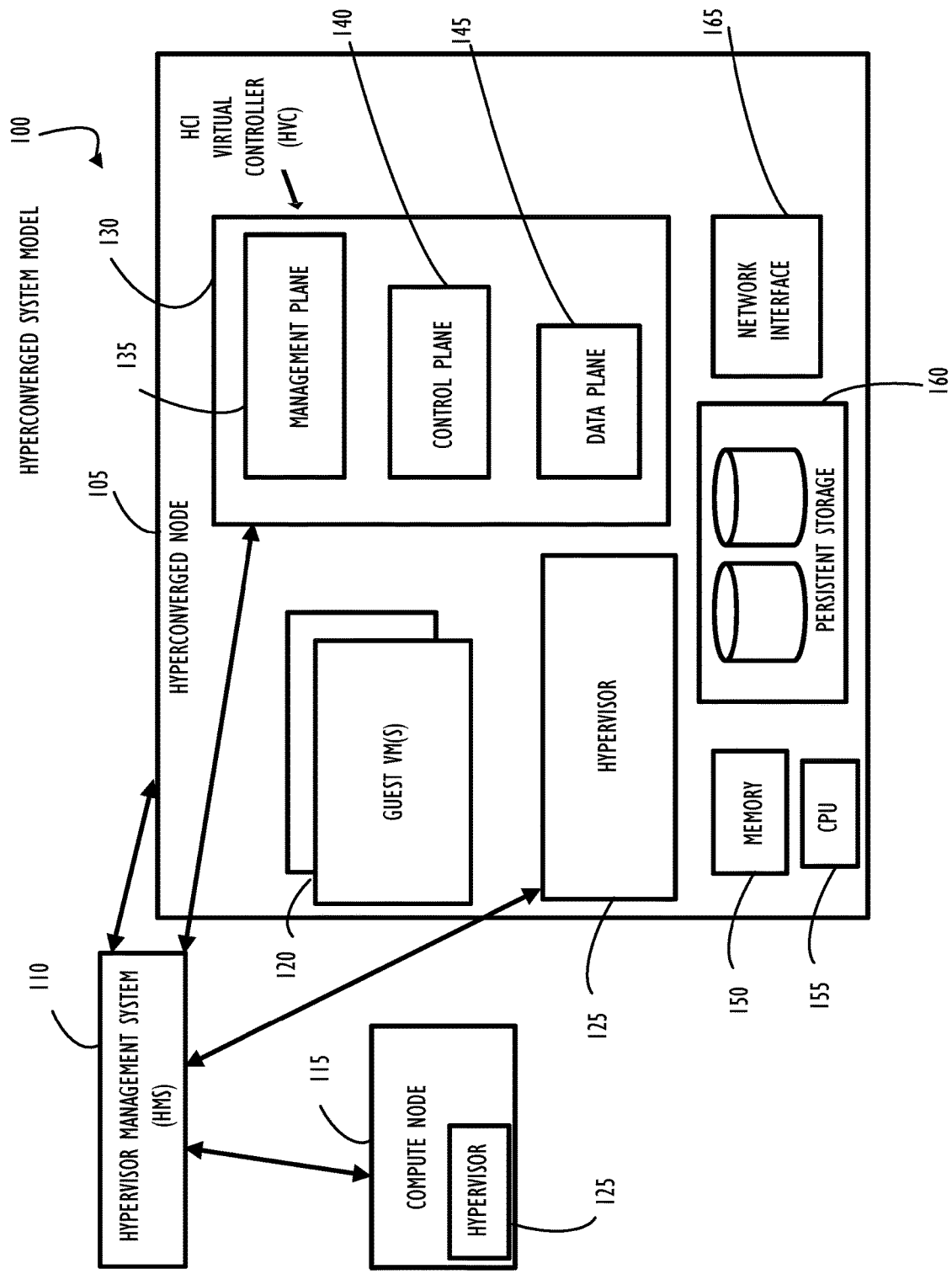
FIG. 1 is a functional block diagram of a hyperconverged system model, according to one or more disclosed implementations.

One aspect of virtualized infrastructure is the decoupling of the application, and the virtual machine(s) on which it runs, from the physical hardware. To improve existing techniques of virtual machine management, it is desirable to perform standard functions of backup, restore, clone, and move for virtual machines within and between the clusters of an HCI system. Using disclosed implementations, these standard functions may be attained while preserving the application's needs for data security, isolation, and shared administration to support multi-vendor virtualization across a collection of multi-vendor hardware and hypervisor systems (and different versions from a common vendor concurrently).

To improve capabilities available to a system administrator for managing large hyperconverged systems, one aspect of this disclosure details a method for configuring dynamically scaled hyperconverged system with non-overlapping and overlapping cluster groups. A method is provided for configuring a dynamically scalable hyperconverged system that assists with piece-wise upgrades of the system while supporting inter-operable and non-interoperable components with secure communication. Disclosed implementations address one or more existing restrictions with respect to scaling a single managed Hyper-Converge Infrastructure (HCI) system where all components are expected (or required) to be running interoperable software versions. In this context, interoperable refers to the ability to dynamically share resources because all components are executing identical (or nearly identical) versions of software because complexities of different capabilities of components may be largely ignored if all components are interoperable.

Accordingly, disclosed techniques that allow for variations in component (and cluster) software versions address infrastructures that may not have identically configured components. This disclosure addresses this situation, in part, by reducing the requirement from all nodes in a hyperconverged infrastructure being interoperable with each other to a requirement of nodes within a cluster group having at least one communication protocol supported at a common version (e.g., interoperable at that version) which represents an improvement to the art of cluster and component management. Additionally, disclosed embodiments may improve security and scale of the HCI by restricting communication to components to include an authorized and secure communication capability between clusters that have an intended data sharing relationship. As a result, disclosed techniques may simplify connectivity management of components of the HCI from manual pairwise configuration to group oriented configuration.

As briefly mentioned above, existing techniques for an HCI have some implementation requirements that may not always be desirable. For example, some existing HCI solutions establish connections between all system nodes whether or not they have an end user data sharing need. In these implementations, there does not appear to be a facility to restrict communication between clusters in a single HCI deployment. Further, upgrades in existing HCI systems are typically performed at a system level and force all clusters within the system to run inter-operable software versions. When forced to provide upgrades at a system level, the system administrator may be presented with unnecessary complexity for implementing upgrades or maintenance. HCI systems implemented using disclosed embodiments may address this limitation of system level upgrades and allow for a more component based upgrade approach to provide the system administrator more upgrade or maintenance options.

As will be explained throughout this disclosure, the disclosed example implementations represent improvements to existing techniques and systems to support an HCI. In one example implementation, a method is disclosed to create a dynamically scalable hyperconverged system that supports the lifecycle management of the underlying hardware and software while providing hyperconverged features to the virtualized applications running on this system. Further, a technique to manage a system of multiple different versions of software in a single HCI is disclosed. Disclosed example methods illustrate how a single management system may be configured to support management of clusters whose data exchange protocols are identical or made up of different versions of controlling software (e.g., hypervisors from different vendors or different versions from the same vendor) that include both interoperable and non-interoperable versions. Further, this disclosure provides an example implementation to maintain data security and application isolation among discrete parts of a managed HCI and component nodes. Further still, support for consolidation of backups in a system comprised of cluster of HCI nodes running interoperable and non-interoperable data exchange protocols is disclosed. Also, a mechanism for dynamically organizing groups of clusters to identify interoperability requirements and to simplify network configuration among these clusters is disclosed.

The aforementioned solutions to problems and example implementations are presented and addressed, in part, by introducing a concept of a "cluster group" (CG) which represents a relationship between clusters in an HCI system that is not present in previous HCI systems. Further, this disclosure describes an interface and method that allows an end user (e.g., system administrator) to construct new CGs, add clusters to a CG, and/or remove clusters from a CG. To maintain security and allow for audit control, CG membership operations may be implemented as secure operations requiring authentication and authorization for any user performing these operations. As a result, the disclosed systems and method represent a foundation for secure inter-group communication and data exchange in an HCI.

In some disclosed implementations, clusters that share membership in a CG are allowed to communicate among each other at the Management, Control, and Data Plane levels and hence must run inter-operable protocol versions (e.g., a compatible communication protocol). In one example implementation, clusters are allowed to exchange data for the purpose of making backup copies of object trees, cloning object trees, and relocating object trees from one cluster to another. In another example implementation, CGs may be configured to allow collections of CGs to be managed by a common Management Virtualization Appliance (MVA) allowing for CGs to co-exist where individual clusters of different CGs are running incompatible software versions.

In some disclosed implementations, there is a technique for further identifying partitions among the set of clusters for the purpose of informing the system about intended separation between the clusters and loss of inter-cluster communication between the defined partitions. This capability introduces additional flexibility for system administrators by allowing the system to have backup and data exchange policies that behave differently when the partitions are attached versus when they are detached. In general, systems configured to support these operations allow for the continued management of the system through a multiplicity of HMS and MVAs while in either attached or detached states. The disclosed capabilities also support deployed systems which may house clusters of the system in mobile environments such as cruise ships, airplanes, and mobile command centers. Overall, the disclosed HCI implementations allow the system to make intelligent use of resources and optimize resource consumption and priority during attached and detached states, in part, through the use of CGs.

Therefore, this disclosure addresses a need for scaleable computer resources while considering flexibility for system administrators. The disclosed techniques, methods, and systems represent an improvement to highly scaleable computer systems, as the use of a CG concept provides another level of configuration grouping and administrative control for HCI systems.

Referring to FIG. 1, an example hyperconverged system model 100 is illustrated that includes a hyperconverged node 105 showing one possible example of logical and physical components for hyperconverged node 105. Each of these example components will be discussed individually below. Also illustrated in hyperconverged system model 100, is an example of a Hypervisor management system (HMS) 110. HMS 110 may be implemented on a dedicated system that is communicatively coupled to one or more hyperconverged nodes (e.g., compute node 115 and hyperconverged node 105) and, in turn, a component (e.g., hypervisor 125) of hyperconverged node 105. In this example, HMS 110 represents a coordination and control mechanism for one or more hypervisors 125 and, in the case of multiple hypervisors 125, each executing on a different hyperconverged node (e.g., compute node 115 which may be configured similarly to hyperconverged node 105), an HMS 110 may coordinate activities across the multiple hypervisors 125. For example, coordinating activities and operations refers to a capability that HMS 110 may provide to an HCI. Conceptually, HMS 110 may be thought of as being a "level above" other nodes in hyperconverged system model 110, although it is possible that it executes as a component (e.g., virtual machine) within a hyperconverged node. As briefly mentioned above, a hypervisor typically controls a physical machine (e.g., hyperconverged node 105 or compute node 115) such that the single physical machine may "host" one or more virtual machines (VMs) that are typically referred to as "guest operating systems" or guest VMs 120.

Hypervisors (such as hypervisor 125) may be provided by different industry vendors as well as possible open source versions. This disclosure is not directed to any specific hypervisor version and, in some implementations, may be used to support an HCI having multiple different hypervisor versions concurrently. Further, in a case where compute node 115 represents a compute resource with a hypervisor 125, that compute resource may represent a physical compute resource that HMS 110 may utilize in a coordinated fashion (e.g., via assignment of pure compute resource tasks) to support processing requirements of other hyperconverged nodes 105. In short, HMS 110 may be configured to coordinate functions/operations (e.g., assign roles, groupings, and responsibilities to nodes and cluster groups) across at least one hyperconverged node 105 and other compute resources (e.g., compute node 115) configured as other hyperconverged nodes or traditional compute node(s) with a hypervisor 125. In general, HMS 110 may be considered an overall controller, scheduler, and coordinator for other components of hyperconverged system model 100.

As further illustrated in FIG. 1, hyperconverged node 105 includes one or more guest VMs 120, a hypervisor 125 to control guest VMs 120, a memory 150, a CPU 155, persistent storage 160, and a network interface 165. Each of memory 150, CPU 155, persistent storage 160, and network interface 165, in this example, represent physical components of hyperconverged node 105. Each guest VM 120 may get partial use of the physical components, as coordinated by hypervisor 125, to perform their intended functions.

Continuing with FIG. 1, hyperconverged node 105 includes HCI virtual controller (HVC) 130 also communicatively coupled to HMS 110. As used in this example, HVC 130 represents a control interface to allow HMS 110 to interact with and coordinate functions of hyperconverged node 105 with respect to other compute resources (e.g., compute node 115) and other hyperconverged nodes (not shown). Also, HVC 130 may be configured to allow direct communication across a group of hyperconverged nodes that form (or are about to form) the above-mentioned CG. HVC 130 includes a management plane 135, a control plane 140, and a data plane 145, each of which represent logical partitions of the functions performed by HVC 130. In general, HVC 130 coordinates activities and manages interactions using functions associated with management plane 135. HVC 130 controls actions of different nodes within a CG using functions associated with control plane 140, and data plane 145 may be used to share data across different compute nodes (e.g., cluster nodes or compute resource nodes). In particular, data plane 145 may be configured to assist with an HCI storage cluster explained below with reference to FIG. 2. HVC 130, in some implementations, may be implemented to execute as a guest VM or a function executing on a guest VM (such as one of guest VMs 120). In some implementations, HVC 130 may be locked to a particular node and provide virtualized storage access to other guest VM's that are running in that converged node.

With the above understanding of example components and functions of hyperconverged model 100, different functional aspects may now be explained. Disclosed techniques may be used to build an HCI that consists of multiple groups of clusters (e.g., multiple CGs) where within each group, clusters may be able to communicate amongst each other. The communication capability may be ensured by making sure that each cluster has an interoperable communication protocol (discussed in more detail below with reference to FIG. 3). Overall, this capability may provide an additional level of scaling, not present in today's HCI systems. The disclosed scaling technique may allow these clusters to be formed in a manner in which the separate cluster group styles (e.g., differently configured CGs) do not need to be interoperable for nodes that don't overlap in those cluster groups (an example of nodes overlapping multiple CGs is discussed below with reference to FIG. 4).

Accordingly, the disclosed scaled system may be "built" (e.g., dynamically configured) to contain a multiplicity of hypervisor management systems, each of which contain a multiplicity of CGs. Scaling may be improved and building an HCI in the disclosed manner may assist in solving some of the problems associated with upgrade. For example, a system administrator may be able to upgrade subsets of the system discreetly from other portions of the system and still preserve the ability to manage the system as a whole. In particular, the ability to allow for CGs running different versions of software may allow for a transitional upgrade rather than having to upgrade all components (e.g., nodes) at the same time.

Additionally, to support business functions such as disaster recovery, system security, system availability, and data backup, a system administrator, using systems implemented with the disclosed techniques, may be able to build a combined hyperconverged system that consists of a multiplicity of hypervisor management systems, which may or may not be running the same vendor's implementation of a hypervisor management system. For example, by creating CGs containing clusters from different managed systems to build a larger system. The disclosed data sharing techniques may further allow an ability to a) perform a backup from a cluster that's managed by one hypervisor management system, b) send that backup to a cluster that's managed by a separate hypervisor management system, and c) support functions of restore and converging of VM's as they cross between those management domains.

Figure 2:
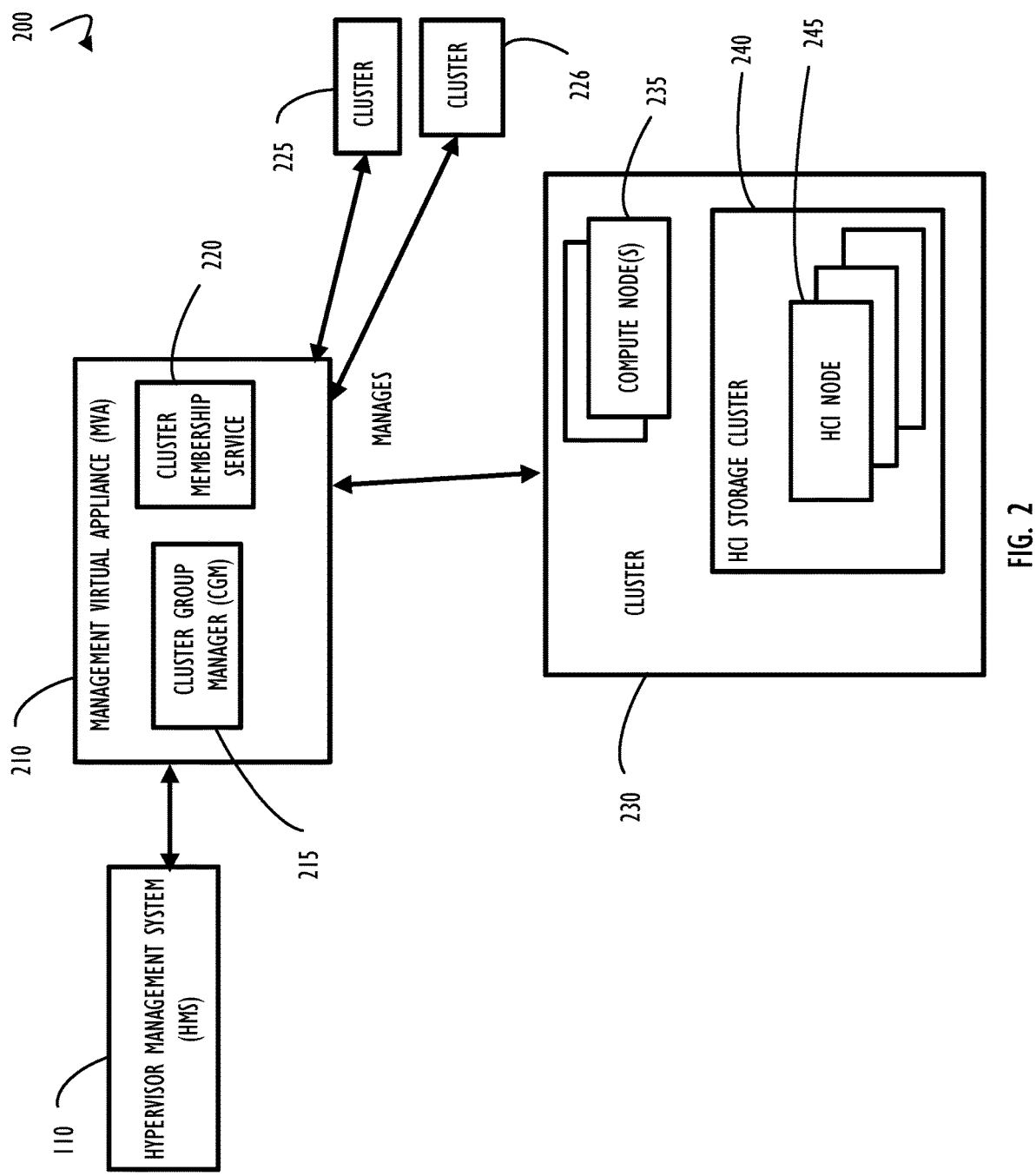
FIG. 2 is a functional block diagram representing a hypervisor management system (HMS), a management virtual appliance (MVA), and multiple clusters, according to one or more disclosed implementations.

Referring now to FIG. 2, computer infrastructure 200 further illustrates the above-mentioned data sharing capability and illustrates an HCI storage cluster 240 across a plurality of HCI nodes 245. In general, HCI storage cluster 240 represents a set of HCI nodes 245 which may be combined together to form a cluster such that storage may be provided in a coordinated manner (e.g., allowing sharing or segregation of data as appropriate) to the virtual machines running within that cluster. Similarly, this example cluster may have additional nodes that are part of it which participate in the processing portion (as opposed to the data sharing portion) and are referred to as compute nodes 235. Recall, compute node 115 of FIG. 1 may represent a "pure" compute node such as one of compute nodes 235. In some implementations, "pure" compute nodes would not have storage. Those pure compute nodes would not be responsible for providing virtualized storage to the virtual machines, but instead they provide the compute environment with memory and networking. Accordingly, some implementations may have compute resources and storage resources segregated within the cluster for redundancy, scalability, performance, and other design considerations.

Continuing with the example computer infrastructure 200, there are multiple clusters 230, 225, and 226 (more are possible but not shown). These clusters may be managed by an element referred to as a management virtual appliance (MVA) 210. This management relationship is illustrated in FIG. 2 by the arrows from MVA 210 to each cluster 230, 225, and 226. Additional clusters may have different implementations, for example, cluster 225 may be a cluster of compute nodes and cluster 226 may host another HCI storage cluster.

Figure 4:
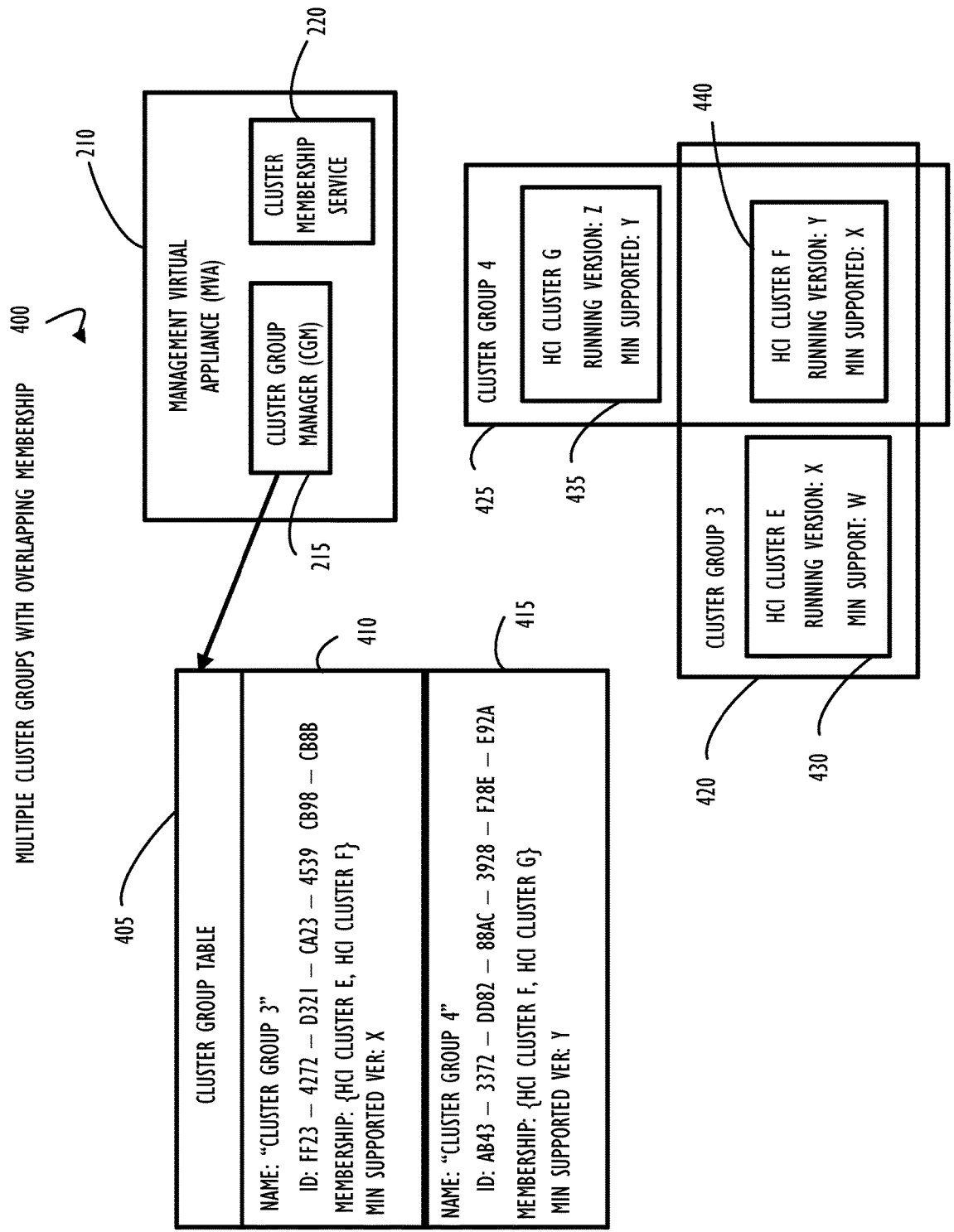
FIG. 4 is a block diagram representing an example of multiple cluster groups having overlapping membership of a common (e.g., shared) cluster component, according to one or more disclosed implementations.

As further illustrated in computer infrastructure 200, MVA 210 may contain at least two services (e.g., functional components) that are shown as cluster group manager (CGM) 215 and cluster membership service 220. In this example, CGM 215 is an entity (e.g., computer function or process) that keeps track of what clusters belong to which groups and cluster membership service 220 tracks which nodes (e.g., compute nodes 235 and HCI nodes 245) belong to which clusters (e.g., cluster 230). Each of these functions and the overall function of MVA 210 may interact with HMS 110. In some embodiments, there may be a one-to-one correlation between an MVA 210 and an HMS 110. However, other embodiments allow for multiple MVA 210 instances to be associated with a single HMS 110. To summarize, there may be multiple MVAs (e.g., like MVA 210) associated with a single HMS 110 or there may be an MVA that is associated with multiple HMSs (e.g., similar to a shared node existing in multiple CGs as illustrated in FIG. 4).

Figure 3:
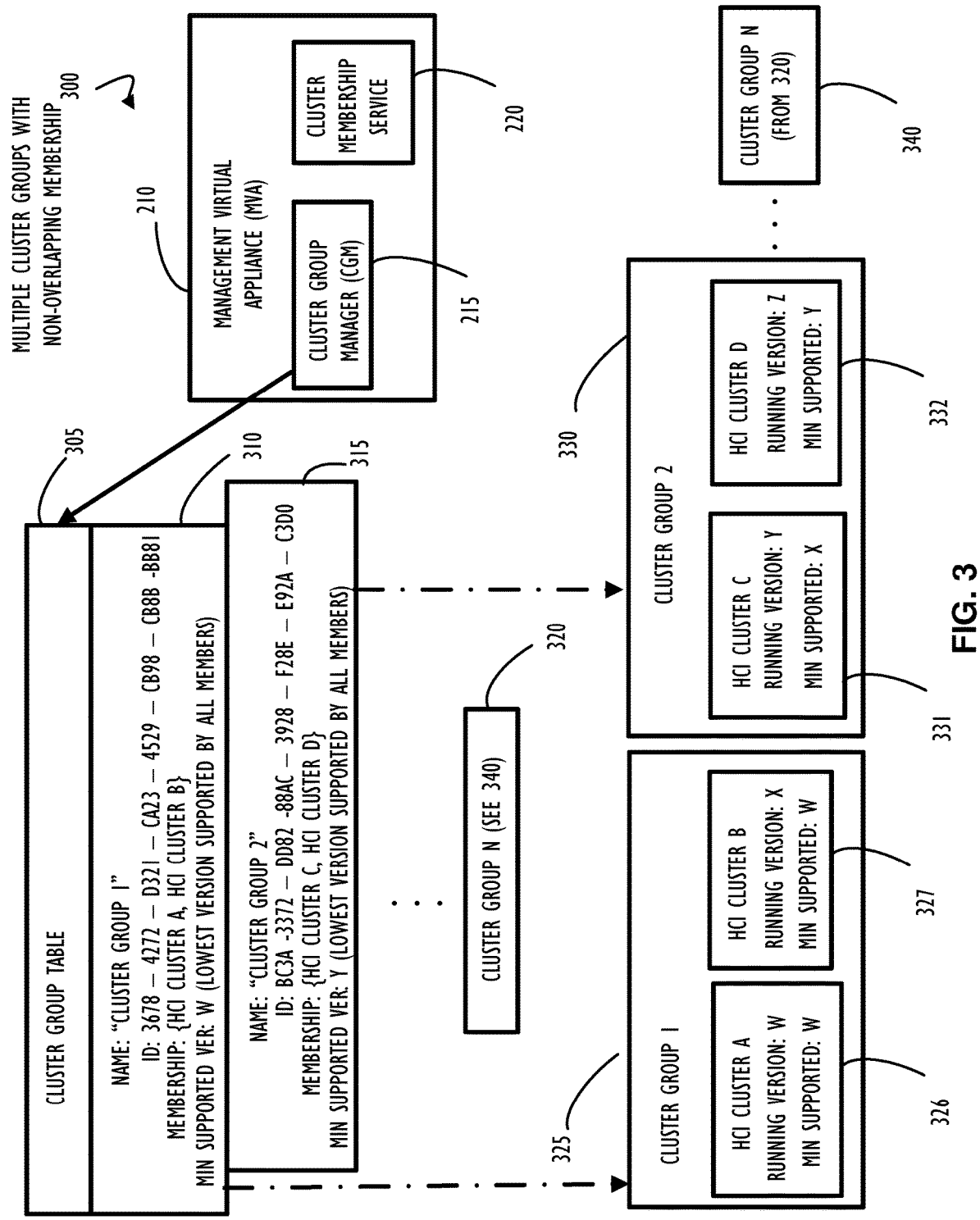
FIG. 3 is a block diagram representing an example of multiple cluster groups with non-overlapping membership of cluster components, according to one or more disclosed implementations.

Referring now to FIG. 3, an example of multiple CGs with non-overlapping membership is illustrated in block diagram 300. Multiple CGs with non-overlapping membership means that each cluster within a given CG is only a member of that single CG and is not shared across CGs. An alternative example of overlapping cluster groups is illustrated below with reference to FIG. 4.

Block diagram 300 illustrates that MVA 210 may utilize the above-mentioned CGM and cluster membership service 220 to interface with Cluster Group Table 305. For example, CGM 215 may maintain a record in Cluster Group Table 305 for each CG currently being managed by MVA 210. Entry 310 of Cluster Group Table 305 indicates that Cluster Group 1 (325) has a name (i.e., "Cluster Group 1"), a unique identifier (e.g., ID: [unique alphanumerical string]), a membership entry (maintained, for example by cluster membership service 220), and a minimum support version identification. As explained further below, the minimum supported version refers, in this example, to a minimum supported communication protocol version for all clusters within the cluster group as opposed to a lowest version that is supported by any one cluster. This ensures that all clusters within a cluster group may communication using a consistent interoperable communication protocol based on this minimum. In the example of FIG. 3, version W is less than version X, which is less than version Y, which is less than version Z, with Z being the highest example version. If a cluster is directed to join a cluster group (e.g., a system administrator tries to add the cluster to a cluster group), that cluster (and every node within that cluster) must be able to facilitate and participate in communication at the minimum supported communication protocol or the cluster may not function properly. Accordingly, if a cluster is not configured with at least the minimum supported communication protocol version, adding of that cluster to a cluster group may be prevented and an informational message may be provided to the system administrator.

Continuing with the example of FIG. 3, Cluster Group Table 305 further includes an entry for record 315 associated with cluster group 2 and an entry for record 320 associated with cluster group N to illustrate that any number of cluster groups may be possible as determined by implementation criteria. Cluster members of cluster group 1 (325) are illustrated as HCI Cluster A 326 and HCI Cluster B 327. As explained above, and illustrated in this example, different clusters within a cluster group may be able to execute at different versions as long as the minimum supported criteria is honored. In this example, HCI Cluster B 327 has a running version of X, while HCI Cluster A 326 has a running version of W. In this example, both HCI Cluster B 327 and HCI Cluster A 326 have a consistent minimum supported version of W. Cluster members of cluster group 2 (330) are also illustrated, and indicated in this example, as HCI Cluster C 331 and HCI Cluster D 332. In Cluster Group 2 (330), the overall minimum supported version is Y, as illustrated in record 315 of Cluster Group Table 305. In this example, HCI Cluster C 331 conforms to this minimum supported version requirement because it has a higher running version of Y and maintains a minimum supported version of X. Further, HCI Cluster D also conforms to this requirement because it has a higher running version of Z and maintains a minimum supported version of Y. Additional cluster groups are also possible as indicated by Cluster Group N 340.

Referring now to FIG. 4, an example of multiple CGs with overlapping membership is illustrated in block diagram 400. In general, this example illustrates that there may be a cluster that is a member of two CGs concurrently. Two CGs are used in this example for simplicity of explanation but some implementations may have more than two CGs concurrently sharing a single cluster. Disclosed techniques for sharing of a cluster across CGs represent yet another level of scalability for a system administrator to use while configuring and maintaining HCI systems. Further, this capability illustrates an additional technique that may be used to link together systems supporting multiple concurrent hypervisors or hypervisors from different vendors. In the example of FIG. 4, there is a one-to-one correspondence between MVA 210 and a hypervisor (not shown). That is, MVA 210, as illustrated in this example, controls cluster group 3 (420) and cluster group 4 (425). Alternatively, there could be another MVA (not shown) that may be interfacing with either cluster group 3 (420), or cluster group 4 (425). In general, there may a second or more additional MVA's that would also have knowledge of CGs and be able to share those CGs. As explained above, underneath a single instance of an MVA 210 there could be any number of CGs. Within more than one CG there may be a node (e.g., HCI Cluster F 440) that belongs to multiple cluster groups underneath that MVA. In this case that is illustrated as HCI Cluster F 440 belonging to both Cluster Group 4 (425) and Cluster Group 3 (420). Note that each of those CGs include additional clusters as illustrated by HCI Cluster Group E 430 and HCI Cluster Group G 425. Note, in order to be a member of multiple CGs, any shared cluster must adhere to minimum requirements of the multiple CGs amongst which it is shared.

Given the above implementation examples, it is apparent that a single hyperconverged node may be combined in a cluster with other hyperconverged nodes. Once combined, there may be an opportunity to provide additional protection to any virtualized storage which is provided in the guest VMs. As explained above, the HCI storage cluster may provide the ability to replicate the storage that is consumed by a guest VM to additional nodes in the system. This replication may allow data to remain available should an initial node fail or should a hardware device for persistent storage on a node fail. For example, the physical storage under a virtual machine may cause data unavailability for that virtual machine. In response to the failure, the replicated storage may be made available to "mask" the failure and therefore minimize data loss or data unavailability. This "masking" capability may be supported by either or both of MVA 210 and HMS 110.

Additionally, the disclosed configuration may provide an additional capability to perform data backups in a more efficient manner because data may be backed up locally or the backups could be performed from a replicated data store on another VM. Overall, nodes form a cluster and with replicated data presented to the VMs may allow a guest VM to move among nodes within a cluster, for example by interfacing (e.g., via MVA 210 and/or HMS 110) to the capabilities of an underlying hypervisor. Further, MVA 210 may run on at least some nodes within each cluster group to provide selected guest VMs with access to virtualized storage as necessary. In one scenario, a failed VM in one cluster of a CG may be restored to a node in another cluster of the CG and maintain access to a replicated copy of its original data.

Figure 5:
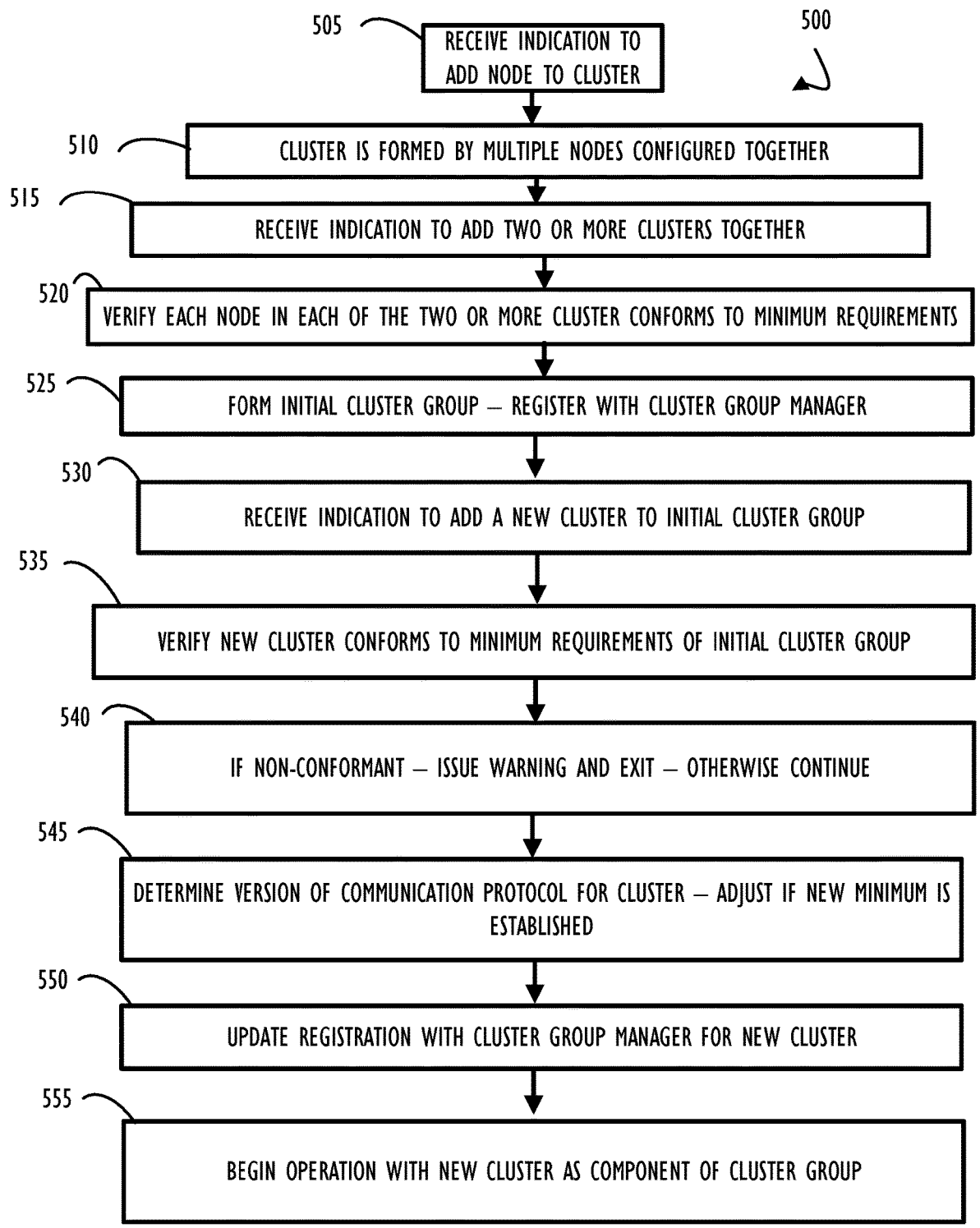
FIG. 5 is a flow chart representing a possible method to support and maintain a dynamically scaled hyperconverged system, according to one or more disclosed implementations.

Referring now to FIG. 5, one example method to create (e.g., build) a cluster of nodes and create a cluster group is illustrated, according to one or more disclosed embodiments. In FIG. 5, example method 500, starts at block 505 where a node is identified to be added to a cluster. As explained above, the node to be added may be an HCI node including storage or a pure compute resource node. In either case, once two or more nodes are added together, a cluster is formed as indicated by block 510. Once a cluster is formed, it may be registered, as necessary, with the cluster membership service, described above. Nodes may be added together to form new clusters, or nodes may be added to existing clusters. Block 515 represents that an indication is received (e.g., from a system administrator) to add two or more clusters together to form a cluster group. Block 520 indicates that each node of the two or more clusters may be interrogated or validated to ensure that each node in the cluster conforms to a set of minimum requirements for the proposed cluster group. Block 525 indicates that an initial cluster group is formed and registered with the cluster group manager (described above). Block 530 illustrates that a further indication may be received to add an additional cluster to the initial cluster group just formed. Block 535 indicates that a verification may be made that the additional cluster will conform to the established requirements of the initial cluster group. In some implementations, it may be possible to adjust the minimum requirements of the already formed cluster group to incorporate the additional cluster. In other implementations, the addition may be blocked if the verification of minimum requirements does not match the already formed cluster group as illustrated at block 540. Block 545 indicates that a determination may be made as to what version of communication protocol will be used within the cluster after adding the additional cluster group and that a possible adjustment may be made. Block 550 indicates that an updated registration entry may be made with the cluster group manager based on adding the additional cluster. Finally, block 555 indicates that method 500 may complete with the additional cluster operating as a component of the cluster group. In this manner, nodes may be added to clusters and clusters may be added to each other to form cluster groups in accordance with the one or more disclosed embodiments.

Figure 6:
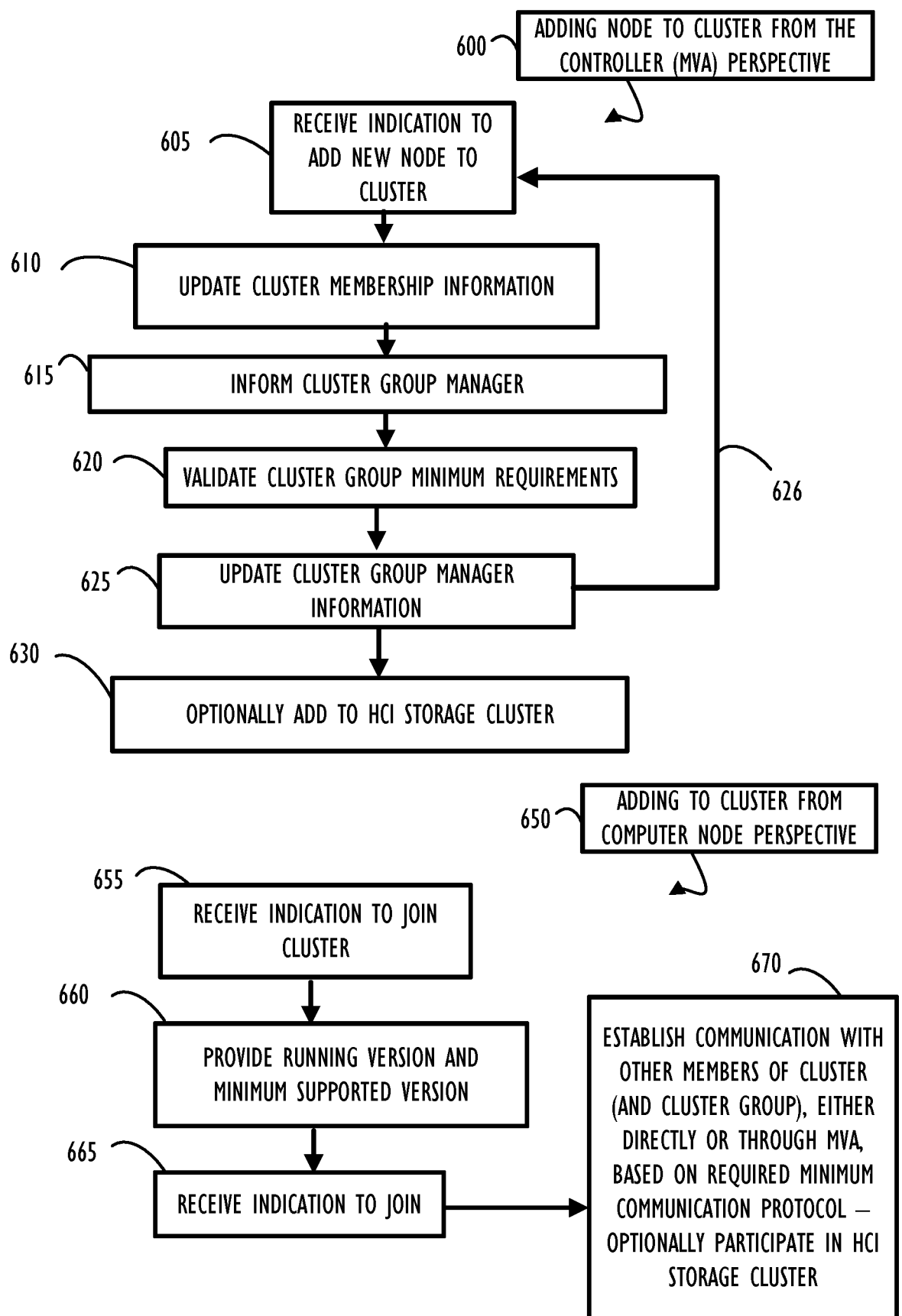
FIG. 6 represents two example methods (possibly subparts of the method of FIG. 5) from the perspective of different types of devices depending on timing of use and desired action for that device, according to one or more disclosed embodiments.

Referring now to FIG. 6, two example methods 600 and 650 are illustrated. Each of method 600 and 650 may also represent possible subparts of method 500 illustrated in FIG. 5. Methods 600 and 650 may be used on different types of devices depending on the perspective and timing of use for that device, according to one or more disclosed embodiments. In the example of FIG. 6, method 600 represents adding a node to a cluster from the perspective of the controller of the cluster, an example of which is described above as the management virtual appliance (MVA) 210 of FIG. 2. Method 600 begins at block 605 where an indication to add a new node to a cluster may be received. Block 610 indicates that cluster membership information may be updated. For example, by cluster membership service 220 of FIG. 2. Block 615 indicates that the cluster group manager may be informed of the alteration performed for the cluster membership. Block 620 indicates that, for adding a node to a cluster, a validation of cluster group minimum requirements may be performed. Block 625 indicates that after successful validation, cluster group manager information may be updated to reflect the change. Flow may then return to block 605 to wait for additional requests, and block 630 illustrates that the new node may be added to the cluster and optionally participate as an HCI storage cluster node as appropriate. Note that alternate methods of removing nodes from clusters, for example based on node failure, would perform similar control actions with respect to both cluster membership service and cluster group manager information, however, validations may not need to be performed when nodes are removed due to failure. Also, if a node was responsible for the minimum requirements of the cluster or cluster group and it is removed, the minimum requirements may be updated (e.g., raised), either concurrently with the removal of that node, or based on a periodic polling of cluster groups and their member nodes.

In the examples of FIG. 6, method 650 represents a technique to add to a cluster from the perspective of the node being added. Block 655 indicates that a node may receive an indication that it is to be added to a cluster. Block 660 indicates that, in response to the indication, the node may provide its running version and its minimum supported version. Block 665 indicates that after providing the version information a confirmation to join may be received at the node. Block 670 indicates that the new node may establish communication with other members of the cluster and possibly cluster group, if the cluster is a member of a cluster group. This communication may be either direct communication (e.g., node to node), communication via MVA 210, or a combination of both. Also, communication may be based on the required minimum protocol and the new node may participate in an HCI storage cluster as appropriate.

Figure 7:
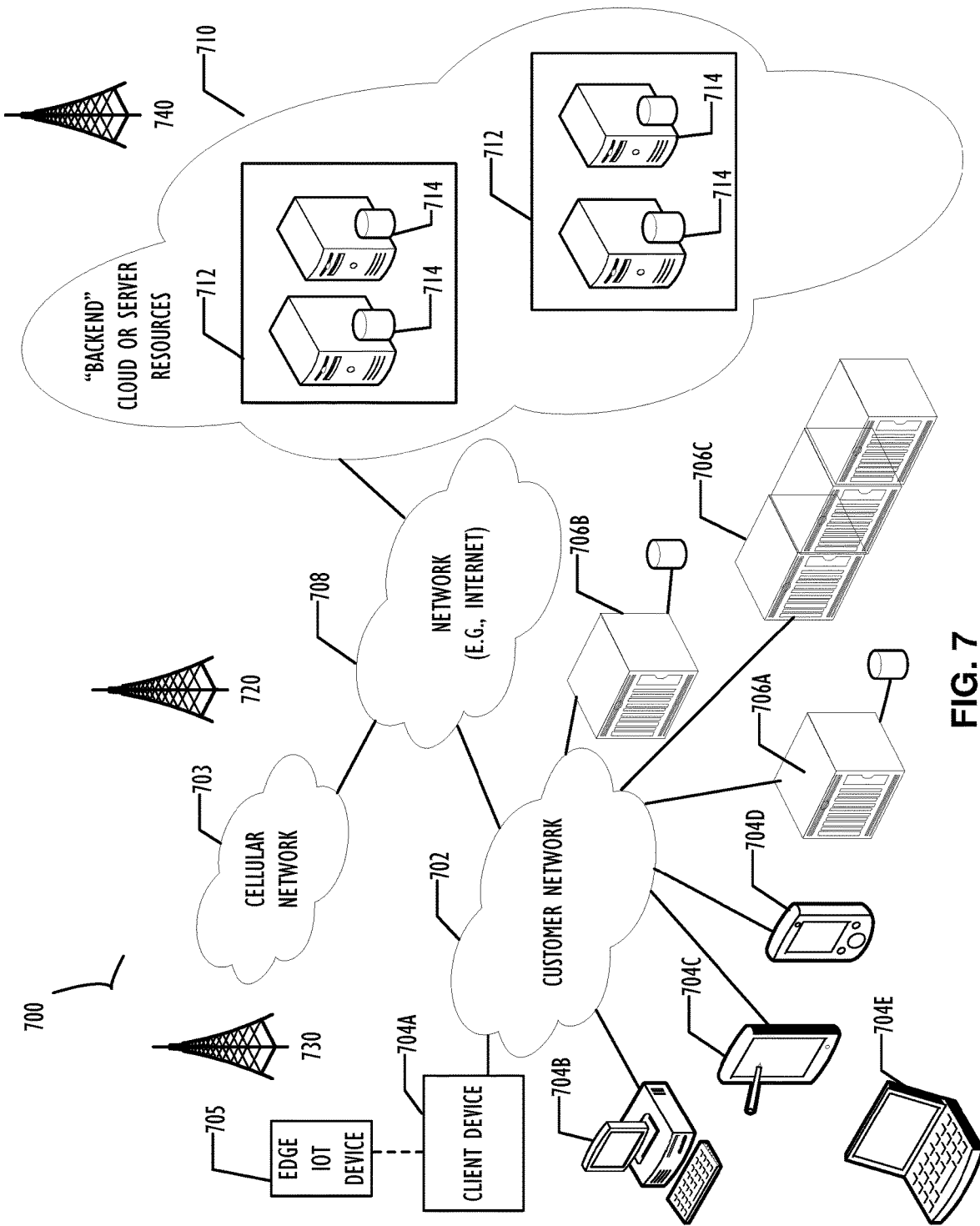
FIG. 7 represents a computer network infrastructure that may be used to implement all or part of the disclosed dynamically scaled hyperconverged system, according to one or more disclosed embodiments.

FIG. 7 represents a computer network infrastructure 700 that may be used to implement all or part of the disclosed dynamically scaled hyperconverged system including an HCI supporting cluster groups, according to one or more disclosed embodiments. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include an HCI using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the frames outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames or clusters (and cluster groups) representing a scalable compute resource that may benefit from the techniques of this disclosure.

Figure 8:
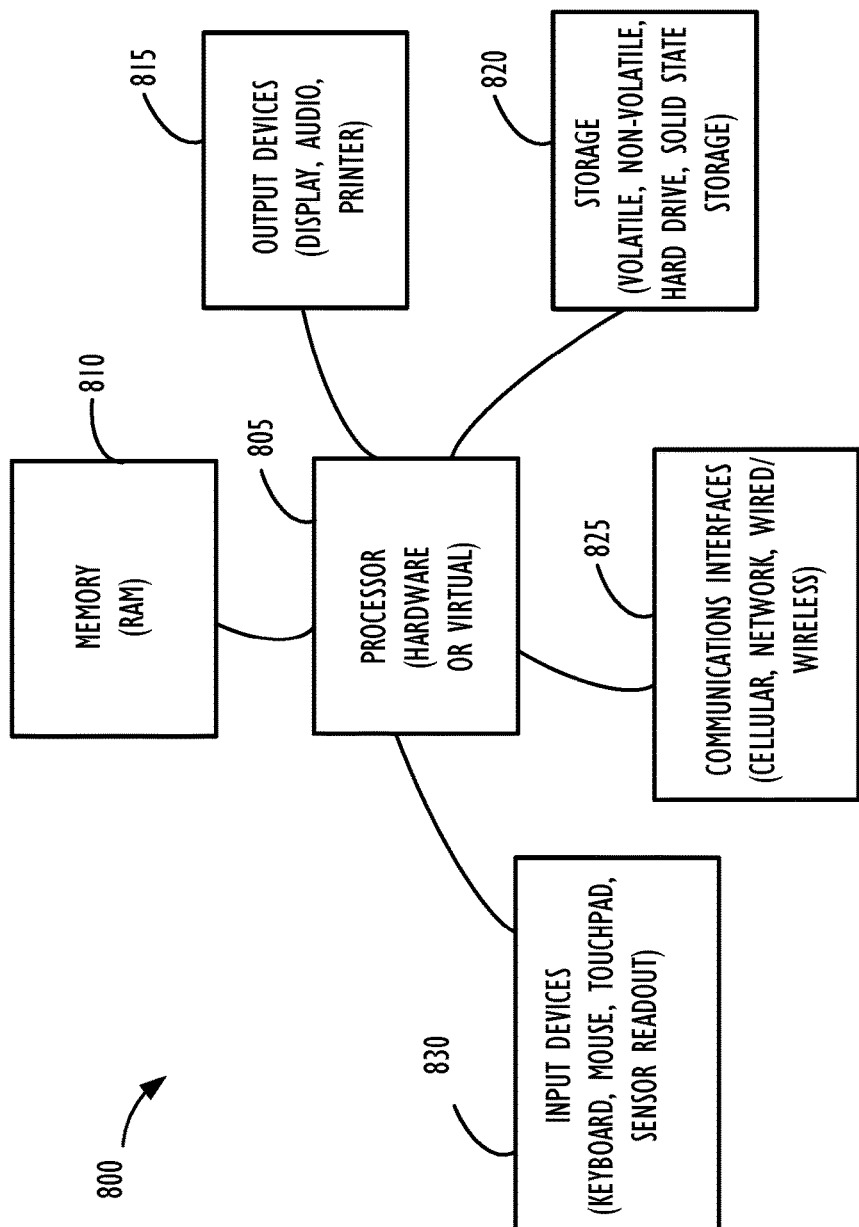
FIG. 8 illustrates a computer processing device that may be used to implement the functions, modules, processing platforms, execution platforms, communication devices, and other methods and processes of this disclosure.

FIG. 8 illustrates a computing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2

(L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
receiving by a management virtual appliance (MVA) an indication to add multiple clusters together to form a first cluster group, the MVA including a cluster group manager to track which clusters belong to each of one or more cluster groups, wherein the first cluster group is a group comprising the multiple clusters, each cluster comprising multiple nodes, and each of the multiple nodes of each cluster comprising a hypervisor, at least one guest virtual machine, and a hyperconverged infrastructure virtual controller (HVC);
registering by the MVA the first cluster group with the cluster group manager;
determining by the MVA a lowest version of a communication protocol that is supported by each of the multiple clusters in the first cluster group;
establishing by the MVA a minimum supported interoperable communication protocol for the first cluster group, the minimum supported interoperable communication protocol being the determined lowest version of the communication protocol that is supported by each of the multiple clusters in the first cluster group;
creating, by the cluster group manager, the first cluster group by establishing communication between the HVC and at least one hypervisor management system (HMS) executing on a system remote from nodes belonging to the multiple clusters of the first cluster group; and
coordinating, by the cluster group manager, operations across a plurality of guest virtual machines of the first cluster group, via the HMS communicating with at least two hypervisors on at least two of the multiple nodes;
wherein the establishment of the minimum supported interoperable communication protocol for the first cluster group by the MVA enables communication between a first cluster and a second cluster of the first cluster group based on the established minimum supported interoperable protocol for the first cluster group, the communication including communication between a first node of the first cluster and a second mode of the second cluster using the minimum supported interoperable protocol.

2. The computer implemented method of claim 1, wherein a first of the at least two hypervisors is of a different software release version than a second of the at least two hypervisors.

3. The computer implemented method of claim 1, wherein a first of the at least two hypervisors is provided by a different vendor than a second of the at least two hypervisors.

4. The computer implemented method of claim 1, wherein a first HVC is configured to coordinate operations between the HMS and a first hypervisor executing on a first hyperconverged node also executing the first HVC.

5. The computer implemented method of claim 4, wherein the first HVC is configured to coordinate operations with the HMS using a management plane function, a control plane function, and a data plane function.

6. The computer implemented method of claim 5, wherein the data plane function of the first HVC is configured to support a hyperconverged infrastructure storage cluster sharing data storage across multiple guest virtual machines executing on multiple nodes of a first cluster of the multiple clusters.

7. The computer implemented method of claim 6, further comprising:
receiving an indication of failure of first data availability, via a first data path, for data access from a first virtual machine of the multiple guest virtual machines;
identifying a second data path for data access to the first data; and
providing data access to the first data for the first virtual machine via the second data path.

8. The computer implemented method of claim 7, further comprising:
identifying a second virtual machine of the multiple guest virtual machines having a shared data storage with the first virtual machine; and
performing a backup of data from the first virtual machine using the shared data storage present on the second virtual machine.

9. The computer implemented method of claim 8, further comprising backing up data from a plurality of virtual machines selected from the plurality of guest virtual machines.

10. The computer implemented method of claim 1, further comprising:
receiving by the MVA an indication to add an additional cluster to the first cluster group;
determining by the MVA whether the additional cluster supports the established minimum supported interoperable communication protocol; and
upon determining by the MVA that the additional cluster supports the minimum supported interoperable communication protocol, adding the additional cluster to the first cluster group.

11. The computer implemented method of claim 10, further comprising:
upon determining by the MVA that the additional cluster does not support the established minimum supported interoperable communication protocol:
if the minimum supported interoperable communication protocol can be adjusted to support the additional cluster, establishing by the MVA a new minimum supported interoperable communication protocol and adding the additional cluster to the first cluster group, and
if the minimum supported interoperable communication protocol cannot be adjusted to support the additional cluster, rejecting addition of the additional cluster to the first cluster group.

12. The computer implemented method of claim 10, further comprising:
upon adding the additional cluster to the first cluster group, receiving an indication to add the additional cluster to a second cluster group;
determining by the MVA whether the additional cluster supports a second minimum supported interoperable communication protocol for the second cluster group; and
upon determining by the MVA that the additional cluster supports the second minimum supported interoperable communication protocol, adding the additional cluster to the second cluster group concurrently with the additional cluster being a member of the first cluster group to create an overlapping set of cluster groups.

13. A non-transitory computer readable medium comprising computer executable instructions stored thereon that when executed by one or more processing units, perform a method to create and maintain cluster groups within a hyperconverged infrastructure, the method comprising:
receiving by a management virtual appliance (MVA) an indication to add multiple clusters together to form a first cluster group, the MVA including a cluster group manager to track which clusters belong to each of one or more cluster groups, wherein the first cluster group is a group comprising the multiple clusters, each cluster comprising multiple nodes, and each of the multiple nodes comprising a hypervisor, at least one guest virtual machine, and a hyperconverged infrastructure virtual controller (HVC);
registering by the MVA the first cluster group with cluster group manager;
determining by the MVA a lowest version of a communication protocol that is supported by each of the clusters in the first cluster group;
establishing by the MVA a minimum supported interoperable communication protocol for the first cluster group, the minimum supported interoperable communication protocol being the determined lowest version of the communication protocol that is supported by each of the multiple clusters in the first cluster group, wherein the cluster group manager is to maintain a record in a cluster group table for the first cluster group, the record including identification of the minimum supported interoperable protocol for the first cluster group;
creating, by the cluster group manager, the first cluster group by establishing communication between the HVC and at least one hypervisor management system (HMS) executing on a system remote from nodes belonging to the clusters of the first cluster group; and
coordinating, by the cluster group manager, operations across a plurality of guest virtual machines of the first cluster group, via the HMS communicating with at least two hypervisors on at least two of the multiple nodes;
wherein the establishment of the minimum supported interoperable communication protocol for the first cluster group by the MVA enables communication between a first cluster and a second cluster of the first cluster group based on the established minimum supported interoperable protocol for the first cluster group, the communication including communication between a first node of the first cluster and a second mode of the second cluster using the minimum supported interoperable protocol.

14. The non-transitory computer readable medium of claim 13, wherein a first of the at least two hypervisors is of a different software release version than a second of the at least two hypervisors.

15. The non-transitory computer readable medium of claim 13, wherein a first HVC is configured to coordinate operations between the HMS and a first hypervisor executing on a first hyperconverged node also executing the first HVC.

16. The non-transitory computer readable medium of claim 15, wherein a data plane function of the first HVC is configured to support a hyperconverged infrastructure storage cluster sharing data storage across multiple guest virtual machines executing on multiple nodes of a first cluster of the multiple clusters.

17. A computer network device, comprising:
a first processing unit;
a first network communications interface communicatively coupling the first processing device to a computer network; and
a memory communicatively coupled to the first processing unit, wherein the memory stores instructions, that when executed by the first processing unit, causes the first processing units to perform a cluster group management function, the cluster group management function configured to:
receive by a management virtual appliance (MVA) an indication to add multiple clusters together to form a first cluster group, the MVA including a cluster group manager to track which clusters belong to each of one or more cluster groups, wherein the first cluster group is a group comprising the multiple clusters, each cluster comprising multiple nodes, each of the multiple nodes comprising a hypervisor, at least one guest virtual machine, and a hyperconverged infrastructure virtual controller (HVC);
register by the MVA the first cluster group with the cluster group manager;
determine by the MVA a lowest version of a communication protocol that is supported by each of the clusters in the first cluster group;
establish by the MVA a minimum supported interoperable communication protocol for the first cluster group, the minimum supported interoperable communication protocol being the determined lowest version of the communication protocol that is supported by each of the multiple clusters in the first cluster group;
create, by the cluster group manager, the first cluster group by establishing communication between the HVC and at least one hypervisor management system (HMS) executing on a system remote from nodes belonging to the multiple clusters of the first cluster group; and
coordinate, by the cluster group manager, operations across a plurality of guest virtual machines of the first cluster group, via the HMS communicating with at least two hypervisors on at least two of the multiple nodes;
wherein the establishment of the minimum supported interoperable communication protocol for the first cluster group by the MVA enables communication between a first cluster and a second cluster of the first cluster group based on the established minimum supported interoperable protocol for the first cluster group, the communication including communication between a first node of the first cluster and a second mode of the second cluster using the minimum supported interoperable protocol.

18. The computer network device of claim 17, wherein a data plane function of a first HVC is configured to support a hyperconverged infrastructure storage cluster sharing data storage across multiple guest virtual machines executing on multiple nodes of a first cluster of the multiple clusters.

19. The computer network device of claim 18, wherein the cluster group management function is further configured to:
receive an indication of failure of first data availability, via a first data path, for data access from a first virtual machine of the multiple guest virtual machines;
identify a second data path for data access to the first data; and
provide data access to the first data for the first virtual machine via the second data path.

20. The computer network device of claim 19, wherein the cluster group management function is further configured to:
identify a second virtual machine of the multiple guest virtual machines having a shared data storage with the first virtual machine; and
perform a backup of data from the first virtual machine using the shared data storage present on the second virtual machine.

21. The computer implemented method of claim 1, wherein the MVA is a sole MVA associated with the HVC, the MVA being in a one-to-one correlation with the HVC.

22. The non-transitory computer readable medium of claim 13, wherein the cluster group table includes a record for each of a plurality of cluster groups managed by the MVA.

* * * * *